Sept. 23, 1969 R. A. DAHLBLOM ET AL 3,469,021

INTERMEDIATE EXCHANGE FOR TELECOMMUNICATION

Filed July 26, 1966 6 Sheets-Sheet 1

INVENTORS
ROLF AUGUST DAHLBLOM
NILS HERBERT EDSTRÖM
JAN ERIK SILWER

BY

Hane and Nydick
ATTORNEYS

Sept. 23, 1969 R. A. DAHLBLOM ET AL 3,469,021

INTERMEDIATE EXCHANGE FOR TELECOMMUNICATION

Filed July 26, 1966 6 Sheets-Sheet 2

INVENTORS
Rolf August Dahlblom
Nils Herbert Edström
Jan Erik Silwer
BY Hane and Nydick
Attorneys INVENTORS
ROLF AUGUST DAHLBLOM
NILS HERBERT EDSTRÖM
JAN ERIK SILWER
BY
Hane and Nydick
ATTORNEYS Sept. 23, 1969 R. A. DAHLBLOM ET AL 3,469,021

INTERMEDIATE EXCHANGE FOR TELECOMMUNICATION

Filed July 26, 1966 6 Sheets-Sheet 4

INVENTORS
Rolf August Dahlblom
Nils Herbert Edström
Jan Erik Silwer

BY Hane and Nydick

Attorneys

INTERMEDIATE EXCHANGE FOR TELECOMMUNICATION

Filed July 26, 1966 6 Sheets-Sheet 5

INVENTORS
Rolf August Dahlblom
Nils Herbert Edström
Jan Erik Silwer
BY
Hane and Nydick
Attorneys INVENTORS
Rolf August Dahlblom
Nils Herbert Edström
Jan Erik Silwer
BY Hane and Nydick
Attorneys 3,469,021
Patented Sept. 23, 1969

3,469,021

INTERMEDIATE EXCHANGE FOR TELECOMMUNICATION

Rolf August Dahlblom, Hagersten, Nils Herbert Edstrom, Vallingby, and Jan Silwer, Nacka, Sweden, assignors to Telefonaktiebolaget L M Ericsson, Stockholm, Sweden, a corporation of Sweden Filed July 26, 1966, Ser. No. 567,981
Claims priority, application Sweden, Aug. 16, 1965, 10,649/65
Int. Cl. H04l *15/04, 15/24*
U.S. Cl. 178—2 3 Claims

ABSTRACT OF THE DISCLOSURE

An intermediate exchange serves a plurality of teleprinter subscribers. Within the exchange there is a sender and a receiver assigned and connected to each subscriber. The exchange is controlled by a computer which establishes the connections between the called and calling subscribers. However, the information flow between the senders and receivers of the called and calling subscribers is via a storage matrix within the exchange so that there is no direct connections between the senders and receivers.

Figure 1:
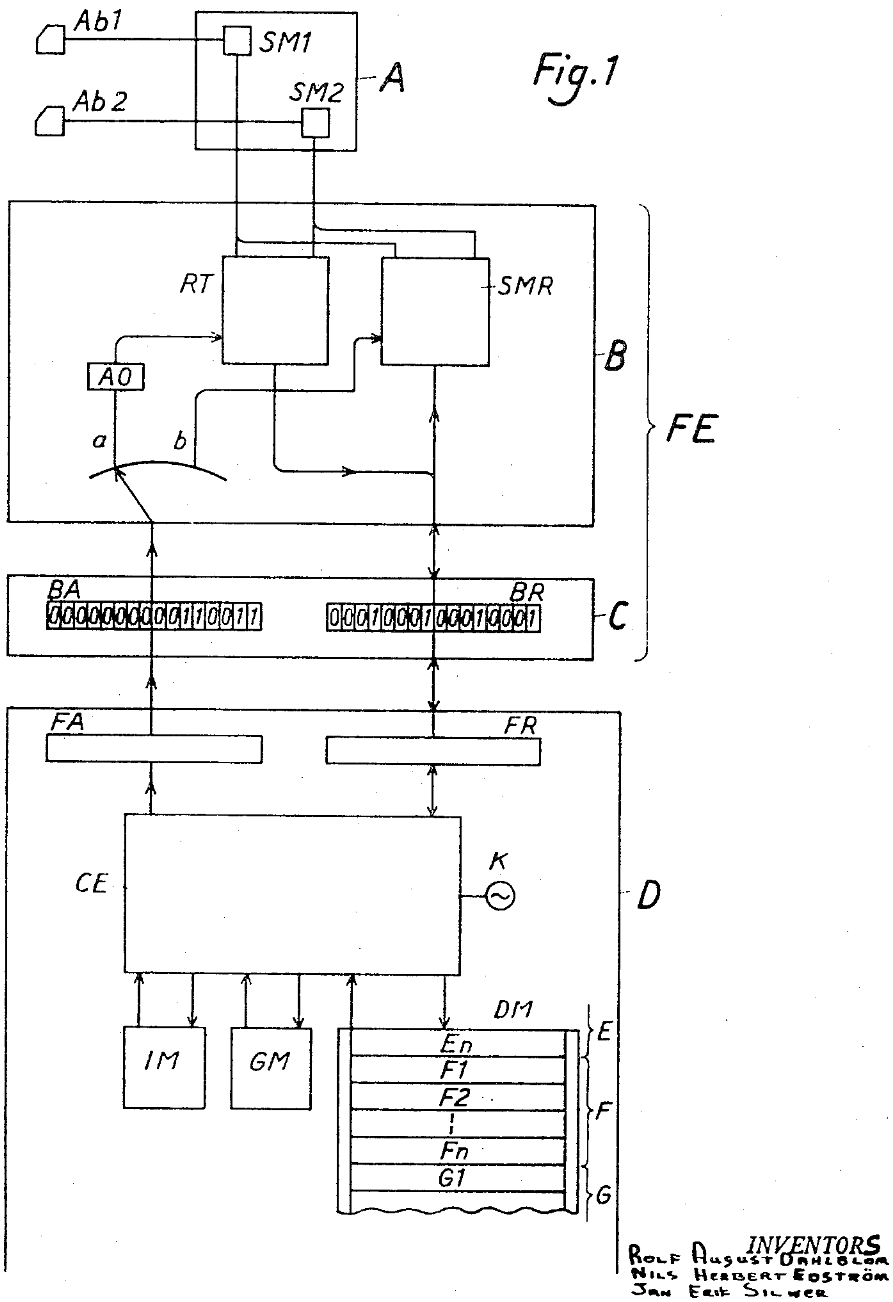

The present invention refers to an intermediate exchange for establishing, without using a network consisting of selectors, a telecommunication connection mainly between two teleprinter subscribers, and for forwarding teletyper characters from one subscriber to another. The intermediate exchange comprises a plurality of receiver means each of which belongs to a determined subscriber and make and break contacts in dependence on the pulses and the pauses respectively in a character obtained from said subscriber in the form of a binary word, and a plurality of sender means each of which belongs to a determined subscriber and which make and break contacts in a line belonging to said subscriber in dependence on the pulses and the pauses respectively in the characters that are to be sent to the subscriber. The digits in the calling number for establishing the connection to a called teleprinter subscriber are obtained in the intermediate exchange from the calling subscriber in the form of binary words.

It is earlier known that in a telecommunication system comprising conventional connecting means, for example selectors, line equipments, relay units and so on, the connection between two subscribers can be set up by a computer by means of a selector network through which the signals from one subscriber to the other have to pass. Said computer obtains information concerning the identity of the subscribers and of the connecting means. Furthermore information concerning their busy- or idle condition in the form of binary numbers, is used to select a connecting path in which all connecting means are idle and then operate all means included in the connecting path by sending a control order to them in the form of binary words. Consequently there are information words concerning the condition of the lines and of the relays, which words are supplied to the computer and there are also binary information words which are supplied from the computer to the telephone exchange so as to operate the connecting means. The words may for example be 16-digit binary words in both directions. With regard to the great difference between the operational speed with which the binary words which operate the connecting means are produced in the computer and the operational speed of the relays and of the selectors, a transfer unit is necessary which stores the information obtained from the computer concerning the operation of the individual, more slowly working means until these have been operated and on the other hand stores the condition information obtained from the individual means until said information has been supplied to the computer.

The fundamental idea of the invention is to make use of the known principle of setting up telecommunication connections through a selector network for establishing a teleprinter connection and dispense with the whole selector network and to make use only of the cooperation between the individual sampling and control means located in the transfer unit and belonging to the respective subscribers on one hand and to the computer on the other hand, so as to store a binary information obtained from a calling subscriber in a memory together with the address of the called subscriber until the computer, by means of said stored information, operates an individual sender means located in the transfer unit and belonging to the called subscriber.

The intermediate exchange according to the invention is substantially characterized by the fact that it comprises a computer which obtains information concerning the condition of the receiver means by reading group by group individual reading points belonging to said receiver means. The reading points by their two alternative voltage conditions represent one of two possible conditions of the respective receiver means, so that each group forms a binary condition reading word readable by a computer. The computer by means of binary words operates group by group operating means located as points in a matrix and having the purpose to operate the respective sender means. The calling address obtained in binary form from a receiver means is stored in a memory in the computer as an identity number corresponding to a determined sender means together with each obtained binary signal information corresponding to a message sign, so that by reading the memory the sender means corresponding to said address can be operated in correspondence to the reversal of signs in a signal obtained from the calling subscriber.

In this manner it will be possible, as long as the connection between the two subscribers is maintained, to forward each pulse-shaped signal obtained from a calling subscriber, to the called subscriber without having a connection set up through a selector network as would be necessary in a speech connection between two subscribers in the conventional manner. The idea of the invention can however be applied not only for forwarding teleprinter characters but also for telephone communications provided that the continuous sound signal is divided into pulses as in the case of pulse code modulated signals or in a telephone communication by means of vocoder.

Figure 2:
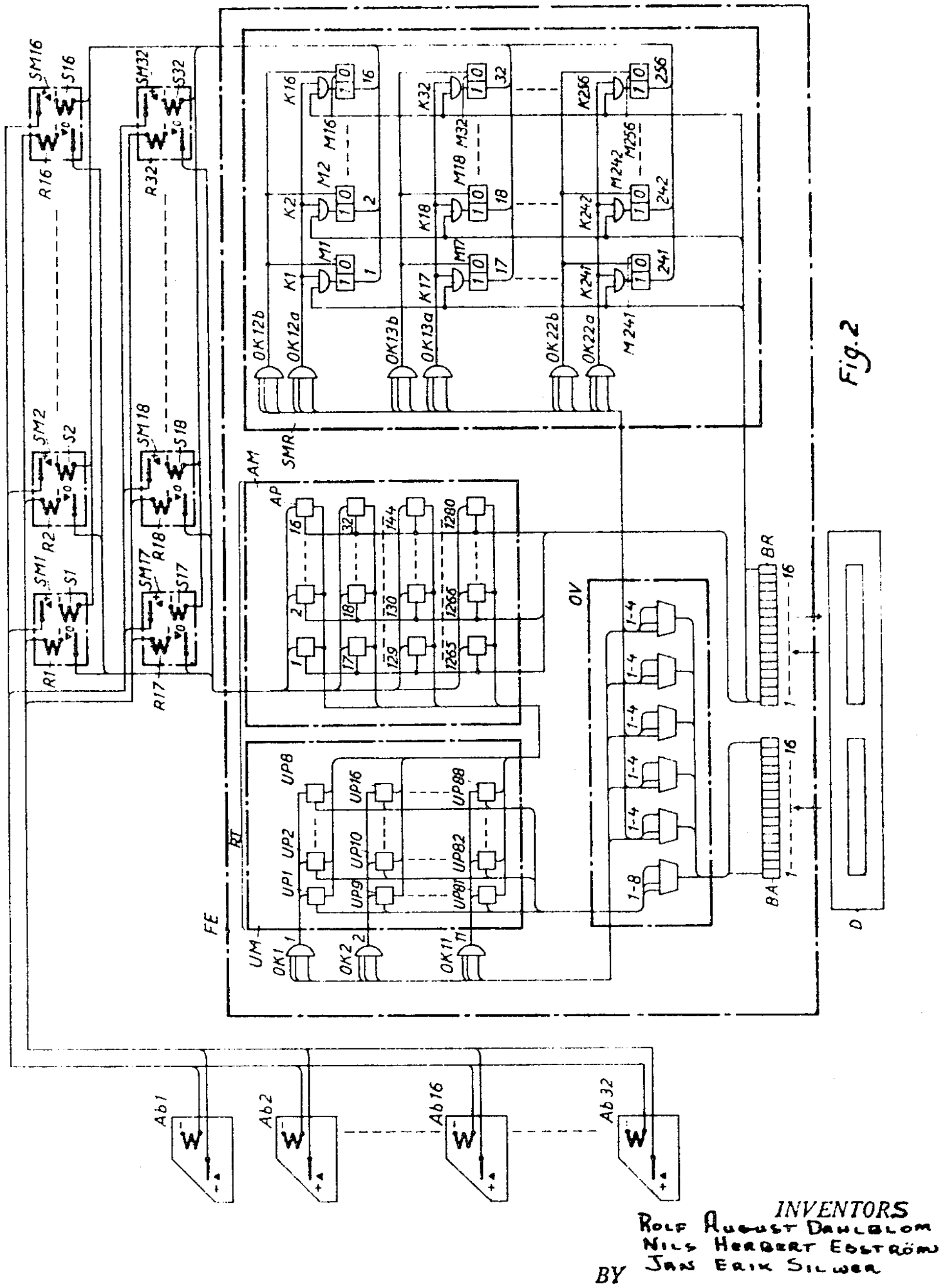
Figure 3:
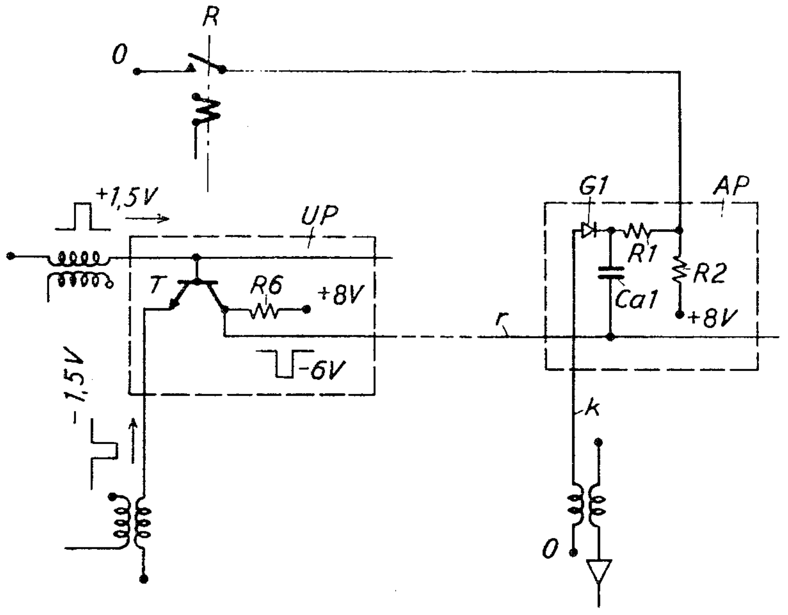
Figure 4:
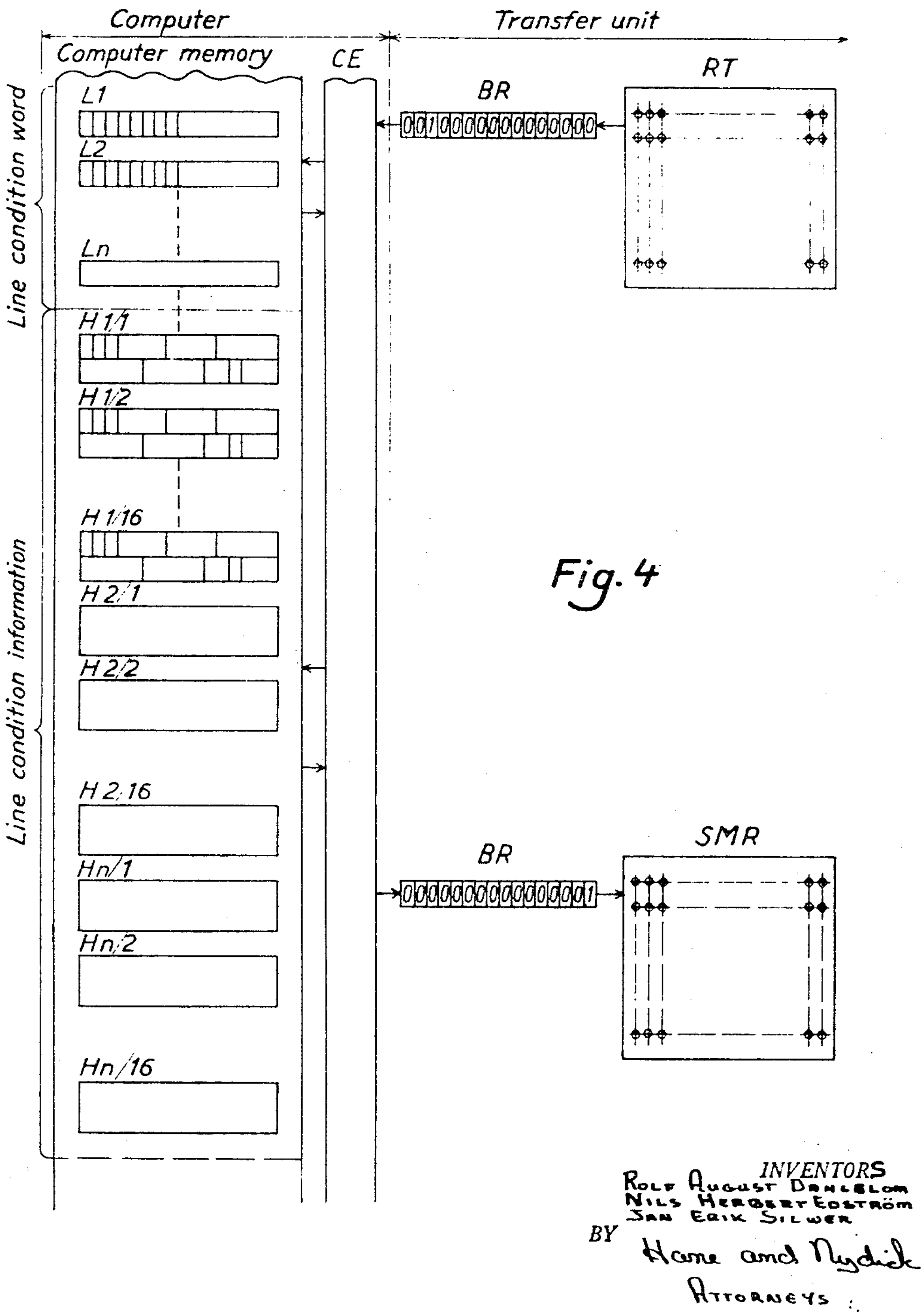
Figure 5:
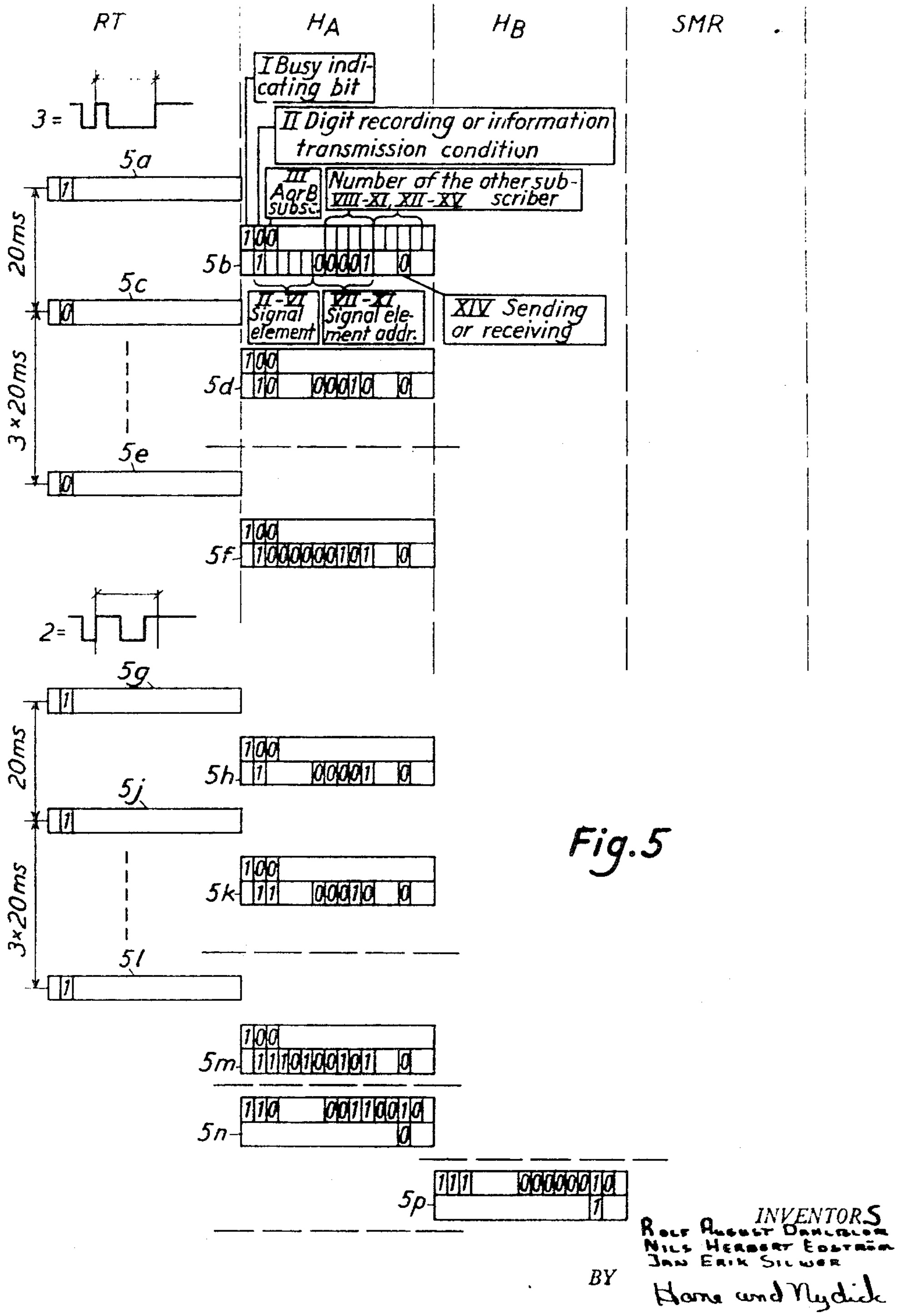
Figure 6:
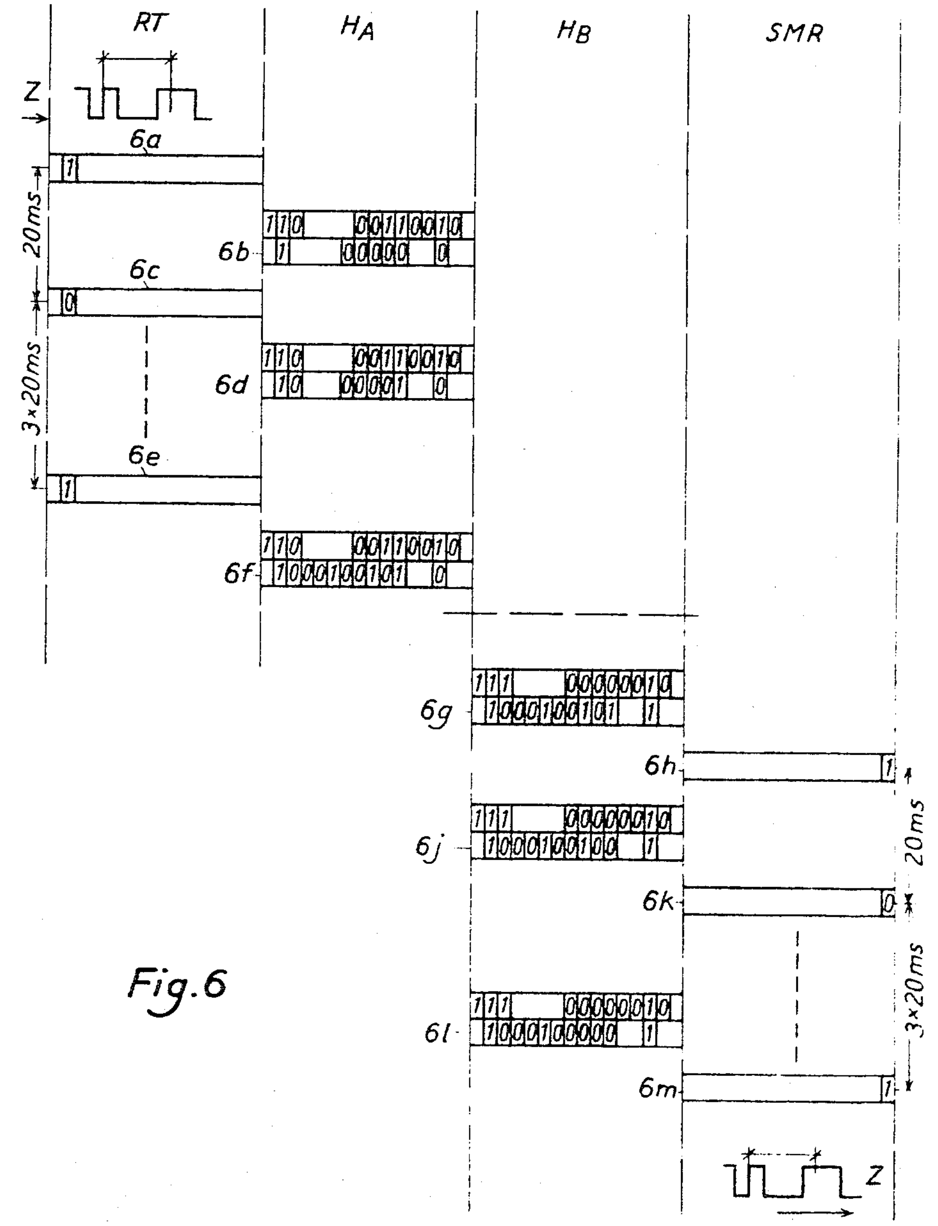

The invention will be explained more in detail herebelow by means of an embodiment with reference to the enclosed drawing in which FIG. 1 shows a block diagram of an intermediate exchange according to the invention, FIG. 2 shows the transfer unit more in detail together with the receiving- and the sending means of the teleprinter subscribers, FIG. 3 shows a crossing point in the selecting matrix more in detail, FIG. 4 shows diagrammatically the cooperation between the memory of the computer and the relay test- and the relay control part respectively of the transfer unit and FIGS. 5 and 6 show diagrammatically the operations in the memory of the computer, by means of which the principle of the invention can be explained.

FIG. 1 shows the three main parts into which generally a computer controlled or data memory controlled telecommunication exchange can be divided. By A is indicated a part consisting of conventional receiver- and sender means SM1, SM2 etc., which can receive pulse-shaped signals from a subscriber *Ab*1, *Ab*2 etc., or can send pulse-shaped signals to the same, for example by closing or opening electromagnetic relays. The transfer unit FE consists of two parts one of which, indicated by B, comprises means which can cooperate with the relatively slow electromagnetic means in the receiver- and the sender units and the other part, indicated by C, contains buffer means which can store the rapid information obtained from the computer and forward it to those parts which operate the relatively slow means. The parts B and C of the transfer unit can be located distantly from each other the part B being located near to the receiver and the sender means, while the part C is located in the computer D itself or in its immediate vicinity.

In FIG. 1 two buffers are indicated in the transfer unit FE of which buffers the address buffer BA, through 16 conductors, is in connection with an address register FA to which the computer supplies the computed address in the form of a 16-digit binary word, and the other buffer, the result buffer BR, through 16 conductors is in connection with a result register FR to which the computer supplies the computed operating information in the form of a 16-digit binary word and to which is supplied from the transfer unit FE the information concerning the condition sampled in the receiver- and the sender units. In FIG. 1 there is written in the address buffer BA as an example written an address, the binary word 0000000000 110011. At the same time there is written in the result buffer BR the binary word 0001000100010001 which for example can indicate that in a group of for example 16 relays the identity of which group is defined by said address, the first, the fifth, the ninth and the thirteenth relay are operated while the other relays are not operated.

As was mentioned earlier the transfer unit FE contains means SMR which can be operated by the information obtained from the computer in rapid sequence and which units store this information until they, through a relatively slower means, have had sufficient time to operate the relays. A relay test device RT supplies information to the computer concerning the condition of the relays. The sampling of said device can be carried out at the rate determined by the computer so that no additional storing device for sending information in the direction of the computer is required. The transfer unit FE also comprises a code translating device AO that translates the binary address information obtained from the computer in to a position in space and vice versa.

The computer D which is not per se an object of the invention is indicated diagrammatically by means of its essential parts. By IM is indicated an instruction memory in which the instruction list is recorded, according to which the computer carries out the stages determined in the program. By GM is indicated a memory for the basic constants, in which the address of the beginning of the different fields in the data memory DM is recorded. In said memory are carried out all temporary memory records during the computing operations and the records concerning the condition of the different means. By CE is indicated a central unit in which all computing operations are carried out and which obtains information from the transfer unit FE, from the instruction memory IM, the basic constant memory GM and the data memory DM and computes the address of those means which primarily are to be operated in the transfer unit. The temporary results obtained during the computing operation are stored in the data memory DM and when the result is computed it will be fed in the form of address words and operating words respectively to the transfer unit. How the computation is carried out falls outside of the scope of the invention. By K is indicated the clock device of the computer, determining the times of the different operations. The data memory DM of the computer contains a great number of memory fields E, F, G, etc., each divided into subfields E1, E2 . . . E*n*, F1, F2 . . . F*n*, etc., for recording in the form of binary words the condition of a definite group of connecting means, of an individual subscriber's equipment, for recording a received digit information, etc. As mentioned earlier these records are changed in the course of the program and are cancelled when the information is no longer necessary.

FIG. 2 shows diagrammatically a number of teleprinter subscribers *Ab*1, *Ab*2, etc., which have each in the intermediate exchange its own sender-receiver means SM1, SM2 of conventional, for example electromagnetic, type. Said means comprise each a receiving relay R1, R2 etc. which can operate in response to a voltage pulse obtained through the line of the subscriber and through their make contact connect a determined voltage to a condition sampling conductor in the direction of the transfer unit FE. Said sender-receiver means comprise furthermore each a sending relay S1, S2, etc. that can be brought to operate by means of a voltage pulse obtained from the transfer unit FE, so that during a determined time it closes a line loop leading to the respective subscriber. The teleprinter characters are received and sent according to the example in a common 5-digit telegraphic code, consisting of current pulses and current pauses or polarity changes, the pulse length being 20 ms. and the character elements being preceded by a starting pulse and followed by a stop pulse. The receiving relays R1, R2 etc. will consequently operate in step with the pulses obtained and the sender relays S1, S2 etc. will operate at the rate that corresponds to the instruction obtained from the computer.

By RT is indicated a test unit having the purpose to produce an information readable by the computer concerning the operated or the non-operated condition of the relays R1, R2, etc. The test unit comprises a reading matrix AM in which each crossing point corresponds to one of the relays the condition of which is to be tested. These points are selected row by row by the computer by supplying a pulse-shaped signal to a row conductor belonging to the respective row. To each point belongs a capacitor which when obtaining said pulse-shaped signal can be discharged if its has been charged owing to the operated condition of the relay connected to the respective point as will be explained in connection with FIG. 3. Thus through the column conductors belonging to points having charged capacitors a pulse-shaped signal will be obtained so that the computer in correspondence to the row read by means of the pulse obtains a binary reading word containing information concerning the operated and the released condition respectively of the relays belonging to the read matrix row, i.e. that a pulse or a pause has been received.

FIG. 3 shows a circuit arranged in each of the reading points AP in the matrix AM in FIG. 2. By *r* is indicated a conductor belonging to the row, by *k* a conductor belonging to the column and by *Ca*1 a capacitor one plate of which is connected to the row conductor. The outer plate is connected to the column conductor and also to a contact on the relay R1, R2, etc., belonging to the crossing point, from which contact in the operated position of the relay 0-potential is obtained according to the example. The reading pulses which are obtained through the row conductor *r* have an amplitude of −6 v. The voltage of the capacitor *Ca*1 is normal, i.e. +8 v. in the released position of the relay in consequence of the fact that it is connected through a resistance to a voltage source. The amplitude of the reading pulse is not sufficient for passing through the rectifier G1 and for this reason no pulse will be obtained through the column conductor. If on the contrary the capacitor has 0-potential due to the fact that the contact belonging to the reading point has been connected to 0-potential, the voltage at the cathode side of the rectifier G1 will decrease with the amplitude of the pulse obtained and, through the column conductor, a pulse will be obtained.

The supplying of the reading pulses to the reading matrix AM is carried out by means of a selecting matrix UM (FIG. 2). In this matrix each crossing point corresponds to a row which is to be read in the reading matrix and these crossing points are activated in such a way that the row conductor and the column conductor belonging to the respective crossing point obtain simultaneously a pulse-shaped signal in consequence of a binary selecting information obtained from the computer. A circuit belonging to a crossing point UP in the selecting matrix UM is shown in FIG. 3. According to the example the circuit comprises an NPN-transistor T, the base of which is connected to the row conductor and the emitter of which is connected to the column conductor and the collector of which is connected through a resistance R6 to a voltage source of +8 v. and also to a row conductor in the reading matrix that is to be selected. In absence of incoming pulses the transistor is blocked and the reading conductor belonging to the transistor in the reading matrix has a voltage of +8 v. When a transistor is to be activated in correspondence to the selecting signal obtained from the computer, the row conductor obtains a pulse of for example +1.5 v. and the column conductor a pulse of for example −1.5 v. in consequence of which the transistor becomes conducting and the selected row conductor in the reading matrix obtains a pulse of −6 v. This pulse passes through all such capacitors in the reading matrix which are connected to 0-potential. The rectifier G1 becomes conducting and through the column conductor belonging to the rectifier a pulse will be obtained. In the sampling points in which the capacitor is connected to +8 v. the rectifier cannot become conducting in consequence of the selecting pulse of −6 v. and through the column conductor no pulse will be obtained.

As mentioned in connection with FIG. 1 the pulses obtained through the column conductors in the reading matrix form a, for example, 16-digit binary information word in view of the condition of the 16 contacts belonging to the row and this word is supplied first to a buffer BR and then to the computer which uses the binary word for the continued computation.

The selecting word that selects the row to be read is fed from the computer to an address buffer BA. However, this word must first be translated in a suitable manner to permit the selection of a row and a column in the selecting matrix UM. The code translation can be carried out in many different ways. According to the example the selecting matrix has 11 rows and 8 columns which are selected in such a way that in a signal translating means 3 binary characters are translated to 1 of 8 and are used to select a column while 5 groups each comprising 2 binary characters are translated to 1 of 4 and thus permit the selection of $4^5$ rows. Said 5 signals form the 5 input conditions of and-circuits OK1, OK2, etc. which belong to the respective rows.

By SMR is indicated a fast relay operation unit that by means of the binary words obtained from the computer operates the slow relays S1, S2, etc. As has been mentioned earlier the fast relay operation units are necessary for reacting to the short pulses of the computer and for maintaining the information obtained in this way until the relays S1, S2, etc. have had sufficient time to be operated. The shown fast relay operation unit SMR consists of a matrix whose crossing points contain a bistable circuit M1, M2, etc. which is operated by the signals of the computer, and maintains closed a make contact of a current path leading to the sender relays S1, S2, etc. as long as the bistable circuit is in activated condition. The selection of a row in the fast relay operation unit SMR is carried out in the same way as the selection of a row in the selecting matrix UM by means of $4^5$ signal combinations obtained from the address buffer BA. The activation of the 16 individual bistable circuits included in a row is carried out through the column conductors of the fast relay operation unit which conductors obtain a pulse in correspondence to the 16-digit binary word which the result register BR has obtained from the computer. To each crossing point belongs an AND-circuit K1, K2, etc. one of the inputs of which is connected to the row conductor and the other to the column conductor, so that only those AND-circuits are activated which in an addressed row obtain an operating signal from the result register BR. In this way the bistable circuit belonging to the crossing point is bright into activated condition so that the relay operates and closes its circuit. The AND-circuits OK12*a*, OK12*b*, OK13*a*, OK13*b*, etc. belonging to the rows correspond to the AND-circuits OK1, OK2, etc. belonging to the selecting matrix UM but they are of course activated by other combinations than the latter. The difference is that here are two separate AND-circuits OK12*a*, OK13*a*, etc., for the activation and OK12*b*, OK13*b*, etc. for the restoring. The output signal of these last mentioned circuits causes 0-setting of the binary bistable circuits belonging to the same row. Consequently, the fast-operating relays RR1, RR2 belonging to the row will release.

FIG. 4 shows diagrammatically the cooperation between the computer and the relay test unit RT and the fast relay operation unit SMR respectively. The relay test unit RT is indicated diagrammatically by means of points which form a matrix having 16 points in each matrix row and in the same manner the fast relay operation unit SMR is indicated by points forming a matrix with 16 points in each matrix row. The buffer register BR stores the information corresponding to a selected row for forwarding it to the computer and stores the operating information obtained from the computer for forwarding it to the fast relay operation unit SMR respectively. In FIG. 4 is shown as an example wherein the third relay from the left of the row selected by the computer has operated and for this reason the buffer register BR contains the binary word 0010000000000000. The central unit CE of the computer which unit carries out all comparing- and computing operations and which is indicated only diagrammatically, carries out a comparison between said word and an information concerning the condition of said relays recorded earlier in the data memory. For each 16-digit binary word that can be read from the test unit TE there is provided a memory subfield L1, L2, etc. in which the line condition word indicating the last sampled condition of the lines in the respective 16-group is recorded. By said comparison between the just sampled word and the earlier recorded word the central unit CE of the computer can determine whether any change has arisen, whether an earlier idle subscriber has been busy, a busy subscriber has been idle or whether on the whole any change has arisen which indicates that sending of a signal consisting of binary character elements proceeds through the line.

To each individual line corresponds a signal condition subfield H 1/1, H 1/2 . . . H 1/16, H 2/1, H 2/2 . . . H 2/16, H ***n*/1, H *n*/2 . . . H *n*/16** which is scanned by the central unit CE of the computer so as to record such information which has been obtained by the change of condition in the binary unit belonging to the respective signal condition field in the line condition word of the memory subfield L1, L2 (or such information which has been obtained due to the non-occurrence of a condition change within a determined time), for example received message signals in binary form, information whether the subscriber belonging to the signal condition subfield is calling or called, whether sending or receiving to or from the subscriber in question proceeds, etc. as it will appear from the description here below more in detail.

Furthermore the central unit CE stores in the signal condition subfield such information which has been computed by means of its program, for example the address to a memory field in which received calling signals are stored or the address of the just received or sent out character element in a character. By means of the information stored in the signal condition field of the calling subscriber concerning the identity of the called subscriber, the central unit CE will find the signal condition subfield of the called subscriber in the data memory and in case this subfield does not contain busy marking, CE writes the identity number of the calling subscriber and marks this subfield as B-subscriber and provides it with a marking indicating sending. This implies that each time when this subfield is sampled by the central unit the information written in the subfield is sensed for transmission. Consequently the central unit will by means of the buffer register BR operate in the fast relay operation unit SMR the crossing point corresponding to the respective signal condition subfield (=subscriber). According to FIG. 4 for example the 16th fast operating relay from the left RR16 in a selected row has been operated which implies that the buffer BR contains the binary word 0000000000000001.

The principle described briefly hereabove will be elucidated more in detail by means of an example but it can be said for now that the fundamental principle of the invention is that the information concerning the calling- as well as the called subscriber is stored in the data memory until a sender means identified by the call digit comes up to be operated in step with the information stored in the data memory. No continuous connecting path between the sending and receiving subscriber is necessary because the connection to the sender relay is again set up each time at an instant determined by the computer. This instant is chosen in such a way that the sending period corresponds to the period of the received character elements but the signals have a certain delay in relation to the received signals, determined by the operation of the computer because the computer serves a large number of subscribers simultaneously and carries out the computation according to a program set up in advance.

In FIGS. 5 and 6 are indicated diagrammatically certain parts of a switching operation and the cooperation between the data memory and the transfer unit of the exchange upon a call from a subscriber and also when forwarding a telegraph character. The figures are divided into four columns wherein the first corresponds to a line condition word, i.e. the condition of a selected row in the relay test unit RT, the second column contains a signal condition subfield of a calling subscriber, the third column contains a signal condition subfield of a called subscriber and the fourth column contains a line condition word corresponding to a selected row in the fast relay operation unit SMR. The signal condition subfield consists of two 16-digit words in view of the fact that a large number of information has to be stored. In FIGS. 5 and 6 however only those records are shown which are essential for the understanding of the invention. In the first row the first binary unit I indicates idle- or busy condition, the second binary unit II indicates that the receiving is carried out for setting up a connection or for the forwarding of characters, the third unit III indicates that the subfield belongs for the moment to an A- or a B-subscriber and the units VIII–XI and XII–XV indicate the identity of the counterparty in a two-digit decimal number. In the second row the binary units II–VI indicate the received character in a five-digit binary telegraphic code and the binary units VII–XI contain address information concerning the character element last received in the telegraphic character. The binary unit XIV indicates that receiving or sending is continued. Sending can also be carried out from the B-subscriber in the form of acknowledgement signals, inquiries, etc. in which case the A-subscriber is the receiving party.

As an example it is assumed that the subscriber nr. 2 calls the subscriber nr. 3. In view of the fact that the test unit RT contains 16 sampling points per row and the fast relay operating unit SMR contains 16 bistable circuits per row, the first row has to be selected for the calling subscriber and the second row for the called subscriber upon for receiving as well as sending of signals. As has been mentioned it is presupposed that the call digits arrive at the exchange in the form of a binary code either by writing the call digits into the teleprinter in which case the call digits are received in five-digit telegraphic code and the computer carries out the necessary translation into binary numbers, or by carrying out a translation from the decimal- into the binary number system before the test unit is operated if the calling signals are obtained in the form of dial pulses.

In FIG. 5 the digit 3 is indicated in 5-digit telegraphic code. As is known each telegraphic character consists of 7 character elements, the first is the start signal followed by the signal information itself consisting of five binary character elements each of 20 ms. long and finally the stop signal which is longer than the other elements. For explaining the principle of the invention it is sufficient to deal with the five information containing character elements and it is not necessary to explain how the computer perceives that sending of a character has been started or has been terminated as this can be carried out in different ways independently of the idea of the invention, nor will there be discussed how the sampling of the received pulses is carried out in order to be able to distinguish with certainty between pulses and pauses when distortion arises through the line. A sampling must in this case be carried out considerably more often than every 20th ms. so as to be able to determine with certainty whether a character element of 20 ms. length is a pulse or a pause.

The telegraphic character 3 can be expressed as 10000. In correspondence to this the binary information word obtained from the test unit will have the form 0100000000000000 upon reception of the first character element in the digit 3, i.e. when a pulse from the calling subscriber having number 2 has operated the receiving relay R2 (FIG. *5a*). For the sake of simplicity it is also presupposed that no call is made from the other subscribers belonging to the same row. Should this be the case the computer deals with the information and the change of information respectively belonging to the respective binary digit position in cyclic sequence.

In correspondence to the read condition of the receiving relay R2 of the calling subscriber the record in the signal condition subfield of the calling subscriber will be changed. According to FIG. *5b* in column 2 the digit position I in the first row contains a binary 1 as an indication that the line is busy, the digit position II is 0 as an indication that registration of a call digit is carried out, digit position III is 0 as an indication that it concerns a subfield belonging to a calling subscriber. In this signal condition the subfield in the second row has written into digit position II "1" in correspondence to the first character element and simultaneously the address record in digit positions VII–XI is changed from 00000 to 00001 as an indication that the first character element has been recorded. After 20 ms. (for the sake of simplicity it is assumed that one sampling per character element is sufficient) the condition of the receiving relay of the calling subscriber is sampled. The binary word from the test unit will be 0000000000000000 because the receiving relay has not been operated as the telegraphic character contains a pause (FIG. *5c*). This information is written into position III in the second row of the signal condition subfield and the address record is simultaneously changed from 00001 to 00010 as an indication that the second character element has been recorded (FIG. *5d*). FIG. *5e* shows the binary information word obtained from the test unit RT upon reception of the fifth character element which is a pause and FIG. 5*f* shows the signal condition subfield when all 5 character elements have been recorded in digit positions II–VI having the character element address 000101 in digit positions VII–XI. The digit 3 is now recorded in a subfield intended for the recording of the call digit which subfield is not dealt with more in detail here. After this the second call digit 2 which is 11001 in 5-digit telegraphic code is received in a similar way as the first, as is indicated in FIGS. 5*g*–5*m*. Also this digit is stored in the subfield intended for the recording of the call digit after which the digits 3 and 2 are written in the signal condition subfield of the A-subscriber in binary form for indicating that each character information which after this arrives from the A-subscriber refers to the B-subscriber having the number indicated above. At the same time in the signal condition subfield the digit position II in the first row will be changed to 1 as an indication that the signals received are to be interpreted as message signals (FIG. 5*n*). A recording is also carried out in the signal subfield of the called subscriber in such a manner (column 3, FIG. 5*p*) that in row 1, position I "1" is written as an indication that the subscriber has been occupied. In position II "1" is written as an indication that it is the question about message characters and in position III is written "1" as an indication that it is the question about a B-subscriber. In the digit positions VIII-XV is written the number of the A-subscriber and in position XIV in the second row is written "1" as an indication that the characters which will be written in the signal subfield of the B-subscriber are intended for sending, i.e. for operating the fast relay operation unit SMR. In the signal condition subfield of the A-subscriber the record in position XIV in the second row is 0 as an indication that it is the question about condition sampling from the test unit RT and not operation of unit SMR.

FIGS. 6*a*–6*m* shows the receiving and sending of a message character, for example the telegraphic character Z which in binary form can be written 10001. In the same manner as has been explained in connection with the receiving of the call digit the signal condition word will be 0100000000000000. In position II, row 2 in the signal condition subfield of the A-subscriber is written "1" and the character element address of positions VII–XI is changed to 00001. Sampling of the condition in unit RT is carried out with 20 ms. intervals as has been described in connection with the digit receiving and after the receiving of the fifth character element there is recorded in the signal condition subfield of the A-subscriber the telegraphic signal 10001 and in position VII–XI the address 00101 as an indication that the fifth character element has been received. In positions VIII–XV is written the identity number 0011, 0010 of the subscriber, i.e. the identity number of the signal condition subfield belonging to the B-subscriber as is indicated in FIG. 6*f*. When the character element address in the subfield of the A-subscriber indicates that the fifth character element has been received, the character elements of the signal condition subfield of the B-subscriber are transferred to positions II–VI in row 2 together with the character element addess. FIG. 6*g* shows the condition in which the writing is already carried out. Upon reading the signal condition subfield of the B-subscriber the computer will determine that the written character 10001 is intended for sending as the record in position XIV, row 2 is 1. Consequently the instruction word 000000000000001 is sent to unit SMR, the sender relay S32 belonging to A*b*32 operates and a pulse is sent to the subscriber. After the first character element has been sent out, the character element address will be changed in such a way that 00101 is changed to 00100, i.e. that instead of the earlier 5 character elements now only 4 character elements are left to be sent. In this manner all 5 character elements are sent out with a 20 ms. interval and then the character element address will be 00000 as an indication that the next character can be transferred from the signal condition subfield of A*b*2 to the signal condition subfield of A*b*32.

As it appears from the described example no fixed connection through a selector network is necessary between two subscribers but the transmission of a character from one subscriber to the other is carried out in such a way that the means of the receiver party, belonging to the intermediate exchange are operated by the computer in accordance with the stored information obtained from the calling party at a rate determined by the computer and at a time determined by the computer.

It is of course possible to store in binary form number information obtained for establishing a connection in case the called subscribed is busy and to make the call after the exchange has obtained an idle signal from the subscriber in question. Furthermore it is possible to store whole messages in binary form so as to forward these to the called subscriber when he has been idle as it is easy to understand by means of the embodiment described.

We claim:

1. An intermediate exchange for establishing a telecommunication connection between at least two teleprinter subscribers and forwarding teleprinter characters from one teleprinter to the other, comprising a plurality of receiver means each one belonging to a determined subscriber and having closing and opening contacts whose operation is dependent on pulses and pauses respectively in a teleprinter character signal received from said subscriber in the form of a binary word and a plurality of sender means each one belonging to a determined subscriber and having closing and opening contacts in a line belonging to said subscriber and whose operation is dependent on pulses and pauses respectively in the teleprinter characters to be sent to said subscriber, at least one computer, a plurality of individual reading points readable by said computer and each belonging to one of said receiver means and having two alternative voltage conditions representing one of said two conditions of the respective receiver means, sender operating means operable by said computer for setting a sender means to one of its two possible conditions, a plurality of storage means each one belonging to one of the subscribers for storing binary signal information to be sent from one subscriber to another subscriber together with a called subscriber address, means for scanning said individual reading points and storing in the storage means of each calling subscriber binary information concerning the address of the called subscriber and the binary information to be transmitted to the latter and represented by changes of the contact condition of said receiver means, means for transferring the binary information to be transmitted from the storage means of the calling subscriber to the storage means of the called subscriber, and means for scanning said storage means so as to successively read out binary information from the storage means marked as belonging to called subscribers and upon each scanning to bring the sender means belonging to the respective called subscriber into closed and open contact condition respectively in accordance with the read out information, so that upon each scanning a new selection of the sender means of the called subscribers is carried out and the sender means are operated and not operated respectively in dependence on the binary information stored, without having any physical connection between the receiver means of the calling subscriber and the sender means of the called subscriber.

2. An intermediate exchange according to claim 1, characterized in that the computer is arranged to store in binary form information for calls for cases when the called subscriber is busy, and to start the setting up of a connection when the called subscriber thereafter becomes idle.

3. An intermediate exchange according to claim 1, characterized in that the computer is arranged, in case the called subscriber is busy, to store the digit information for calls as well as the message in binary form and to thereafter establish a connection from the exchange to the called subscriber when the latter has become idle and to forward the stored message.

References Cited

UNITED STATES PATENTS

| | | | |
|---|---|---|---|
| 2,976,347 | 3/1961 | Fisher et al. | 178—2 |
| 3,251,929 | 5/1966 | Kafitz | 178—2 |

| | | | |
|---|---|---|---|
| 3,347,989 | 10/1967 | Riddell | 178—2 X |
| 3,347,990 | 10/1967 | Doyle et al. | 178—2 X |

THOMAS A. ROBINSON, Primary Examiner

U.S. Cl. X.R.

178—3; 179—3; 340—147, 172.5